(12) United States Patent
Prozorov

(10) Patent No.: US 6,317,463 B1
(45) Date of Patent: Nov. 13, 2001

(54) METHOD AND APPARATUS FOR FILTERING DATA-STREAMS

(75) Inventor: Robert B. Prozorov, Holland, PA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 0 days.

(21) Appl. No.: 09/332,326

(22) Filed: Jun. 14, 1999

(51) Int. Cl.[7] .................................................. H04B 1/66
(52) U.S. Cl. ............................................................ 375/240.29
(58) Field of Search .............................. 375/240, 240.01, 375/240.26, 240.29; 370/392, 99, 94.1, 110.1; 380/16, 50; 348/5.5, 6, 7, 8–10, 461–465, 469–473; H04B 1/66

(56) References Cited

U.S. PATENT DOCUMENTS 5,321,750 * 6/1994 Nadan ...................................... 380/20
5,619,501 * 4/1997 Tamer et al. .......................... 370/392
5,974,501 * 10/1999 Shaver et al. ......................... 711/105
6,177,922 * 1/2001 Schiefer et al. ...................... 345/132

* cited by examiner

Primary Examiner—Chris Kelley
Assistant Examiner—Tung Vo
(74) Attorney, Agent, or Firm—Dirk Brinkman

(57) ABSTRACT

A data stream filter includes a first memory bank storing a pattern field, and a second memory bank storing an enable field. A comparator compares units of an input data stream with identically sized units of the pattern field according to corresponding units of the enable field. An input controller, coupled to the comparator and second memory bank, writes matching units of the input data stream over the corresponding units of the pattern field, and an output controller, coupled to the comparator and the second memory bank outputs the content of the second memory bank when all units of the pattern field are matched.

14 Claims, 2 Drawing Sheets

METHOD AND APPARATUS FOR FILTERING DATA-STREAMS

BACKGROUND OF THE INVENTION

This invention relates generally to information filters, and more particularly, to filters for extracting system information from HDTV transport data streams.

BACKGROUND OF THE INVENTION

Information filters are used in many applications where it is necessary to select and extract information from a data stream. The extracted information has to satisfy a predetermined pattern. For example, information filters are used to select and extract system information from a transport data stream (TS) in a HDTV (MPEG) data stream.

FIG. 1 shows a typical prior art information filter 100. The filter requires three memory banks. A first bank 110 stores programmable values as a pattern field 111. The pattern field can be written to the first bank by a host computer. A second bank 120 stores an enable field 121 also written by the host. The enable field indicates the locations of the enabled bits in the pattern field. A third bank 130 stores bits from the data stream 140 which will be output when bits from the data stream 140 match bits in the pattern field 111, selected by the enable field 121.

Only bits specified in the enable field have to be matched with the bits of the pattern field. All input bits are stored in the third memory bank so that all of the input bits may be output when matching conditions are met.

The matching is performed by a comparator 150 that compares the bits of the data stream 140 with the bit pattern 111 according to the enable field 121. In order to minimize the size of the comparing logic, and to increase the operational speed of the filter 100, the input data stream is usually compared serially with the pattern field, or in a serially/parallel format where suitable, i.e., the comparison is done in units of eight bits (a byte) at the time.

If the data stream includes matching patterns, then a matched signal on line 151 causes an output controller 160 to output the content of the third memory bank. The output 161 is the extracted system information. If the pattern field of the filter 100 is fully programmable with one bit resolution, then all three memory banks have to be at least equal to the size of the pattern field. This makes this type of filtering a memory-demanding application. It is desired to reduce the amount of memory used while filtering a data stream.

SUMMARY OF THE INVENTION

The invention provides a data stream filter. The filter includes a first memory bank storing a pattern field, and a second memory bank storing an enable field.

A comparator compares units of an input data stream with identically sized units of the pattern field according to corresponding units of the enable field.

An input controller, coupled to the comparator and second memory bank, writes matching units of the input data stream over the corresponding units of the pattern field.

An output controller, coupled to the comparator and the second memory bank outputs the content of the second memory bank when all units of the pattern field are matched.

In one aspect of the invention the data stream includes a system table, and the units are eight bits.

DETAILED DESCRIPTION OF THE PREFERRED EMBODIMENT

Figure 1:
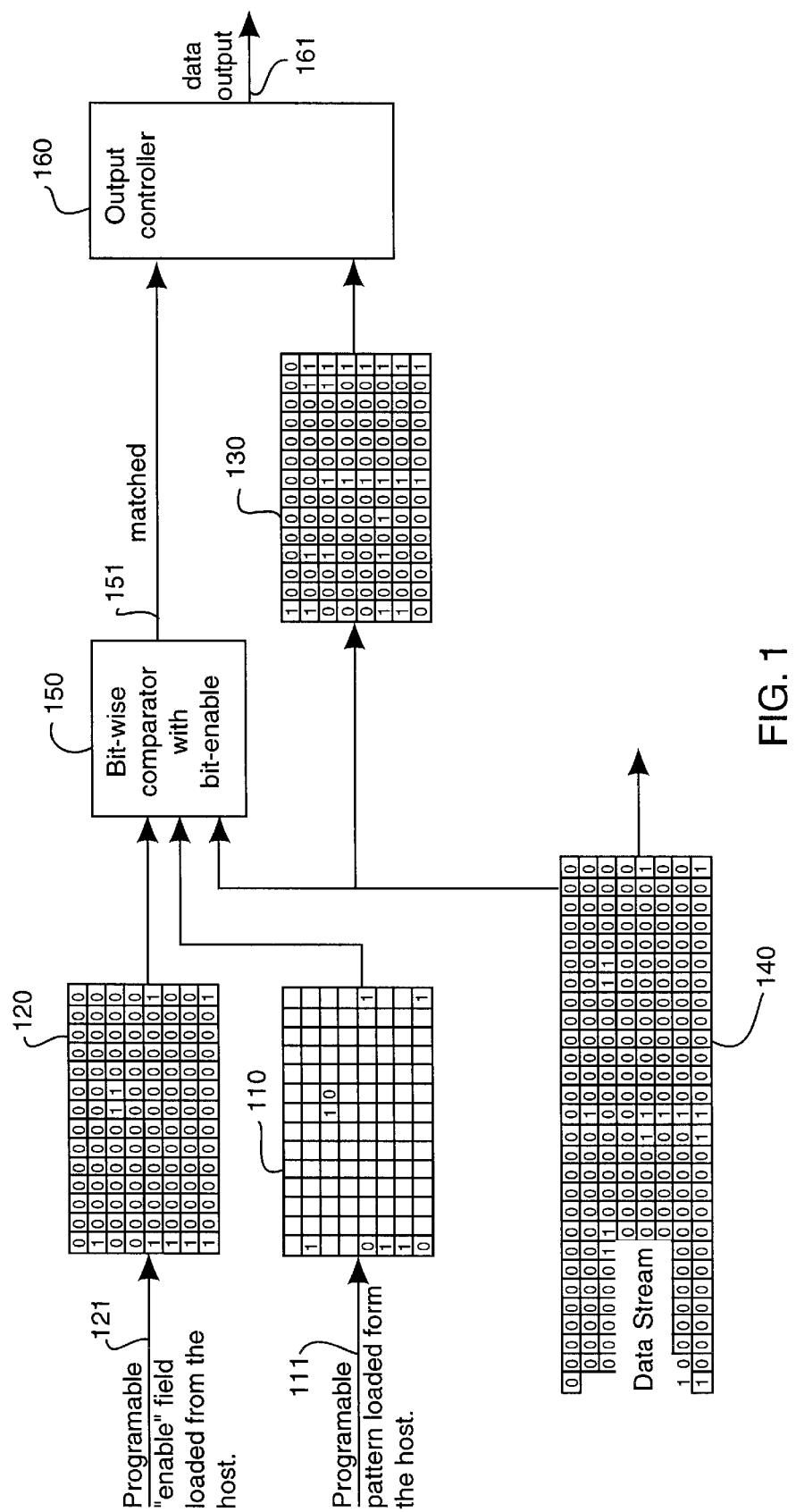
FIG. 1 is a block diagram of a prior art data stream filter.
Figure 2:
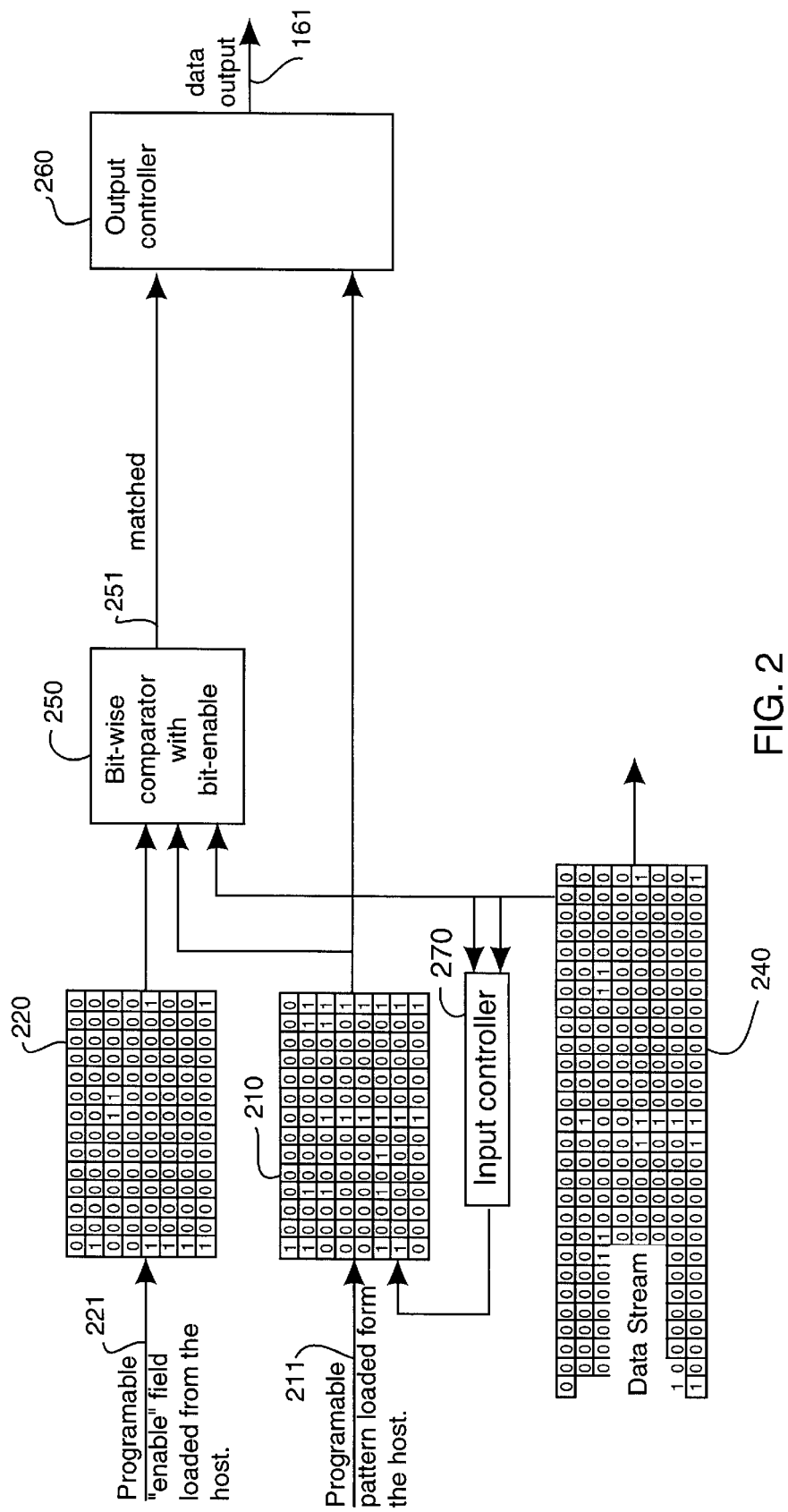
FIG. 2 is a block diagram of a data filter according to the invention.

FIG. 2 shows an information filter 200 according to my invention. A first bank 210 store programmable values as a pattern field 211. The pattern field can be written to the first bank by a host computer. A second bank 120 stores an enable field 221 also written by the host. The enable field indicates the locations of the enabled bits in the pattern field. Bits in a data stream 240 are matched by a comparator 250 according to the bit pattern and enable fields. The comparing can be bit-wise, byte-wise, or word-wise units of any size.

My filter 200 requires only two memory banks. This provides a ⅓ memory saving over the comparable prior art information filter 100. The memory saving is achieved as follows.

Each unit of the input data stream 240, e.g., bit, byte, or word, is compared with the corresponding unit of the pattern field according to the enable field. If all required fields are matched, then that unit of the data stream is written over the corresponding unit of the pattern field in the second memory bank by an input controller 270. This overwriting will not alter the programmed pattern field, because all programmed bits were already matched and are the same. Units that do not match can be discarded because the filtering condition is not satisfied.

If the data stream 240 includes matching bits for the entire pattern field, then a matched signal on line 251 causes an output controller 260 to output the content of the second memory bank. The output 161 is the extracted system information.

Application

In an MPEG2–7 data stream, a System Information (SI) table header is encoded as 112-bits (14 bytes), it is desired to test this section with the programmable pattern. Therefore, the enable and pattern fields are also 112 bits. Using the above described technique, implemented with a byte-wise comparator 250, the bytes of the data stream are written to the corresponding unit of the pattern field in the second bank on a match. When all of the bits during a filtering cycle are matched, the entire contents of second memory bank 210 are output as matched data 262 saving fourteen bytes per filter. The following data in the matched SI table are passed to output without filtering.

It is to be understood that various other adaptations and modifications may be made within the spirit and scope of the invention. Therefore, it is the object of the appended claims to cover all such variations and modifications as come within the true spirit and scope of the invention.

I claim:

1. An apparatus for filtering a data stream, comprising:
   a first memory bank storing a pattern field;
   a second memory bank storing an enable field;
   a comparator comparing units of an input data stream with identically sized units of the pattern field according to corresponding units of the enable field;
   an input controller, coupled to the comparator and second memory bank, writing matching units of the input data stream over the corresponding units of the pattern field; and
   an output controller, coupled to the comparator and the second memory bank outputting the content of the second memory bank when all units of the pattern field are matched.

2. The apparatus of claim 1 wherein the data stream includes a system information table.

3. The apparatus of claim 1 wherein the pattern and enable fields are respectively written to the first and second memory bank by a host computer.

4. The apparatus of claim 1 wherein the units are bits.

5. The apparatus of claim 1 wherein the units are bytes.

6. The apparatus of claim 1 wherein the units are words of any size.

7. The apparatus of claim 1 further mismatching units are discarded by the input controller.

8. A method for filtering a data stream, comprising the steps of:

writing a pattern field to a first memory bank;

writing an enable field to a second memory bank;

comparing units of an input data stream with identically sized units of the pattern field according to corresponding units of the enable field;

writing matching units of the input data stream over the corresponding units of the pattern field; and outputting the content of the second memory bank when all units of the pattern field are matched.

9. The method of claim 8, wherein the data stream includes a system information table.

10. The method of claim 8, wherein the pattern and enable fields are respectively written to the first and the second memory bank by a host computer.

11. The method of claim 8, wherein the units are bits.

12. The method of claim 8, wherein the units are bytes.

13. The method of claim 8, wherein the units are words of any size.

14. The method of claim 8, wherein mismatching units of the input data stream are discarded.

\* \* \* \* \*